United States Patent

Lallier et al.

[11] Patent Number: 6,001,192
[45] Date of Patent: Dec. 14, 1999

[54] PAINT STRIPPING COMPOSITION

[75] Inventors: Jean-Pierre Lallier, Paris; Stephane Fouquay, Mont-Saint Aignan, both of France

[73] Assignee: Elf Atochem S.A., Puteaux, France

[21] Appl. No.: 09/038,001

[22] Filed: Mar. 11, 1998

Related U.S. Application Data

[62] Division of application No. 08/070,298, Jun. 2, 1993, Pat. No. 5,753,603.

[30] Foreign Application Priority Data

Jun. 2, 1992 [FR] France ................................. 92 06639

[51] Int. Cl.⁶ ........................................................ B08B 3/04
[52] U.S. Cl. ............................ 134/38; 510/201; 510/212; 510/409
[58] Field of Search ................................. 134/38, 39, 40; 252/364; 510/212, 407, 202, 505, 500, 506, 413, 206, 365

[56] References Cited

U.S. PATENT DOCUMENTS

| | | |
|---|---|---|
| 2,694,658 | 11/1954 | Crepeau et al. |
| 3,673,099 | 6/1972 | Corby et al. |
| 4,098,719 | 7/1978 | Hushebeck |
| 4,120,810 | 10/1978 | Palmer |
| 4,401,748 | 8/1983 | Ward, Jr. et al. |
| 4,403,029 | 9/1983 | Ward, Jr. et al. |
| 4,428,871 | 1/1984 | Ward et al. |
| 4,444,648 | 4/1984 | West |
| 4,661,208 | 4/1987 | Berg |
| 4,664,721 | 5/1987 | Valasek ........................ 134/26 |
| 4,744,834 | 5/1988 | Haq |
| 4,812,255 | 3/1989 | Suwala ........................ 252/142 |
| 4,836,950 | 6/1989 | Madsen et al. |
| 4,983,224 | 1/1991 | Mombrun et al. |
| 5,006,279 | 4/1991 | Grobbel et al. ........................ 252/542 |
| 5,015,410 | 5/1991 | Sullivan |
| 5,049,314 | 9/1991 | Short ........................ 252/542 |
| 5,085,795 | 2/1992 | Narayanan et al. |
| 5,106,525 | 4/1992 | Sullivan ........................ 252/162 |
| 5,188,675 | 2/1993 | Dormon-Brailsford |
| 5,308,527 | 5/1994 | Lallier et al. ........................ 252/162 |
| 5,334,331 | 8/1994 | Fusiak ........................ 252/542 |
| 5,346,640 | 9/1994 | Leys ........................ 252/162 |
| 5,753,603 | 5/1998 | Lallier et al. ........................ 510/212 |

FOREIGN PATENT DOCUMENTS

| | | |
|---|---|---|
| 549129 | 11/1957 | Canada . |
| WOA860376 | 7/1986 | Denmark . |
| 0442271 A1 | 8/1991 | European Pat. Off. . |
| 0490726 | 6/1992 | France . |
| 86/03766 | 7/1986 | WIPO . |
| 88/06640 | 9/1988 | WIPO . |

*Primary Examiner*—Yogendra Gupta
*Assistant Examiner*—Gregory E. Webb
*Attorney, Agent, or Firm*—Burns, Doane, Swecker & Mathis, L.L.P.

[57] ABSTRACT

Inexpensive paint stripper compositions containing neither chlorinated nor alkaline solvents and well adapted for removing paints such as glycerophtalic, alkyd-urethane or arylic urethane paints on a variety of substrates, e.g. wood and metal substrates comprise (a) 1 to 99% by volume of an aprotic polar solvent chosen from the group comprising: dimethyl sulfoxide, dimethyl formamide, N-methylpyrrolidone, N-methylmorpholine, γ-butyrolactone, acetonitrile and mixtures thereof; and (b) 99 to 1% by volume of an ether selected from the family of ethers having a flash point higher than 0° C., a molar volume less than 160 and a molecule that includes one or several methoxy groups.

35 Claims, No Drawings

PAINT STRIPPING COMPOSITION

This application is a divisional of application Ser. No. 08/070,298, filed Jun. 2, 1993, now U.S. Pat. No. 5,753,603.

BACKGROUND OF THE INVENTION

1. Field of the Invention

The present invention relates to a novel paint stripping composition and, more especially, to a novel paint stripping composition containing neither chlorinated nor alkaline solvents. It also relates to the process for removing paint from a substrate, using this composition.

2. Description of the Prior Art

U.S. Pat. No. 3,600,322 describes the use of mixtures of methylene chloride and methanol for stripping paint, varnish or lacquers. Paint stripping compositions containing lactams or lactones, particularly N-methyl-2-pyrrolidone or butyrolactone, in admixture with other active compounds, for example alkylene glycol ethers, are also known to this art. Compare in this respect WO 86/03,766 and WO 88/06,640 and U.S. Pat. Nos. 5,011,121 and 5,015,410.

U.S. Pat. No. 2,694,658 describes the use of DMSO as a solvent for paint stripping applications.

Nonetheless, all of the above solvents present the disadvantages of being expensive and of being present in the compositions in considerable amounts. Thus, a serious need exists in the surface coating removal industry for stripping formulations that are as effective as those of the prior art, but which are significantly less expensive.

SUMMARY OF THE INVENTION

Accordingly, a major object of the present invention is the provision of improved paint stripping compositions which avoid or conspicuously ameliorate the above disadvantages and drawbacks to date characterising the state of this art.

Briefly, the present invention features a novel paint stripping composition comprising, by volume:

(a) 1 to 99% of an aprotic polar solvent chosen from the group comprising: dimethylsulfoxide (DMSO), dimethylformamide (DMF), N-methyl-pyrrolidone (NMP), N-methylmorpholine (NMm), γ-butyrolactone (BLo), acetonitrile (AcN) and mixtures thereof; and (b) 99 to 1% of an ether selected from the family of ethers having:
  a flash point higher than 0° C.,
  a molar volume less than 160,
  a molecule having one or several methoxy groups.

The expression molar volume as used herein should be taken to mean the ratio between molar mass and density.

DETAILED DESCRIPTION OF THE PREFERRED EMBODIMENTS OF THE INVENTION

More particularly according to the present invention, in a preferred embodiment thereof the aprotic polar solvent of said paint stripping composition is dimethyl sulfoxide. According to another preferred embodiment, the said ether is selected from the family of ethers having:
  a flash point higher than 0° C.,
  a molar volume less than 160,
  a molecule having one or several methoxy groups
  a molecule devoid of hydroxy groups.

In one preferred embodiment, the aprotic polar solvent and ether are present in amounts of, respectively, 1 to 20% and 99 to 80% by volume, and more preferably in respective amounts of 5 to 15% and 95 to 85% by volume. A volume ratio of the components of about 10/90 is particularly preferred.

In another preferred embodiment, the aprotic polar solvent and the ether are present in amounts of, respectively, 20 to 80% and 80 to 20% by volume. In this embodiment, the aprotic polar solvent and the ether are particularly advantageously present in amounts of, respectively, 40 to 60% and 60 to 40% by volume, a volume ratio of 50/50 being specially preferred.

In one preferred embodiment of the paint stripping composition the ether is chosen from the group comprising: anisole, 1,2-dimethoxybenzene, 1,3-dimethoxybenzene, 1,4-dimethoxybenzene, 1,2,3-trimethoxybenzene, 2-methoxy-1,3-dioxolane, 2-methoxy-3,4-dihydropyrane, 2,5-dimethoxytetrahydrofurane, ethylene glycol dimethyl ether, diethylene glycol dimethyl ether, 1-ter-butoxy-2-methoxyethane. The preferred aprotic polar solvent is dimethyl sulfoxide.

The composition may include a surfactant, which is advantageously a halogenated surfactant. Any known anionic, cationic or amphoteric surfactant is appropriate, a fluorinated surfactant, in other words one which includes one or several fluorine atoms being preferred, and a surfactant comprising the compound of formula:

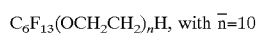

$C_6F_{13}(OCH_2CH_2)_nH$, with $\bar{n}=10$ being particularly preferred Such a compound is for example available commercially under the registered trademark Forafac® 1110.

The invention also provides a paint stripping composition for the stripping of acrylic-polyurethane or polyester-polyurethane paint on a metal substrate.

Additionally, the invention provides a paint stripping composition for stripping glycero-phtalic or alkyd urethane paint on a wood substrate.

The paint stripping composition according to the invention may also include conventional additives; such additives include one or more of: a co-solvent, an activator, a fire-proofing agent, a thickener, a stabilizer, a surfactant, an evaporation inhibitor and, in general, any additive provided that said additive is not a chlorine-containing solvent. In particular, addition of fats of animal or vegetable origin, for example certain esterified cuts, enables the flammability of the mixture to be reduced. Cellulosic derivatives such as methyl cellulose or aerosils (such as pyrogenous silica) can be added to thicken the mixture of solvents.

Addition of a surfactant enables stripping to be speeded up. Similarly, stripping is speeded up by the addition of an appropriate amount of methanol.

The invention also features a technique for removing paints and coating from substrates by contacting such paints or coatings with the compositions described above. Preferably, the paints are those typically used in the construction industry and the substrate is metal such as aluminum, or is wood.

The composition of this invention can be prepared by simply mixing the various constituents, using a stirrer or any suitable equipment.

The stripping process is carried out by contacting the object or surface that is to be stripped with a composition according to the present invention. Such contacting is continued until the paint swells, forms blisters and becomes detached. The substrates or surface to be stripped can be contacted with a composition according to the present invention in a variety of ways. Exemplary thereof are immersion, squirting, soaking using a paint brush, etc. The contacting is carried out at a temperature ranging from 5° to 40° C.; advantageously the ambient temperature is generally comprised between 5° and 25° C. The contact time typically ranges from 15 to 45 minutes.

In order to further illustrate the present invention and the advantages thereof, the following specific examples are given, it being understood that same are intended only as illustrative and in nowise limitative.

EXAMPLES

Technique Employed

The substrates coated with paint were immersed in 30 ml of stripping composition according to the invention at ambient temperature (20°) for at least 30 minutes. Performance was estimated by inspecting the effects obtained.

(A) Glycerophthalic Paint+Undercoat/wood

This was a mature paint which, hence, was perfectly cross linked. When that which is herein defined as a "low-performance (o) solvent composition" was used, the glycerophthalic paint (brilliant layer) remained intact or, at most, when inspected by binoculars (magnification G=7x) several small bubbles spread over the surface could be detected. A "high-performance solvent composition (*)" produced a surface replete with large scales. The substrate was then rinsed with a water jet (mechanical action) in order to eliminate the scales which were not adhered thereto. The surface was then inspected using binoculars (G=7x). When using a "very high-performance solvent combination (**)", it was found that the undercoat layer was partially detached over the entirety of the surface.

(B) Alkyd-urethane Paint/wood

As above, this was also a well matured paint and hence perfectly cross linked. A low-performance solvent composition produced no observable effect at the surface and the paint retained its brilliant finish. For a high-performance solvent composition (*), the surface was covered with scales, but these could not be detached even after intensive washing with water. Contrariwise, after immersion in a very high-performance solvent composition (**) it was observed that a simple water jet permitted essentially all of the scales formed to be removed.

(C) Acrylic-polyurethane/aluminium Paint

Using a low-performance solvent composition, only a beginning of stripping was observed, around the edges of a board. After one hour, there was no improvement in stripping. A very high-performance solvent composition (**) provided detachment of the entire film in less than 15 minutes. Using only a high-performance composition (*), several extra minutes of immersion were required in order to elicit the same effect. In this case, the film was always detached in less than 30 minutes. Whether using high-performance or very high-performance compositions, an elongation of the film by several millimeters was always observed (relative elongation <30%).

(D) Epoxy/aluminium Paint

After immersion for 1 hour, a softening of this very resistant paint was observed using high-performance compositions (*). Simple scraping was then sufficient to remove it with relative ease. A very high-performance solvent stripping composition (**) based on formic acid, via its mechanism or chemical action, did completely remove the epoxy layer without any scraping being required.

Results of Tests

Eleven ethers were tested singly and in combination with DMSO and NMD, in a volume ratio of about 10/90.

Below, the results obtained for the eleven ethers alone or in composition form according to the present invention are given and compared with the action of a composition containing methyl-tertio-butyl-ether, representative of the prior art.

These were the effects observed for the four types of paints associated with their supports for the cases listed A to D:

when the ethers were employed alone, practically no stripping action was observed;

when the ethers were associated with 10% DMSO or 10% NMP, it was noticed that a swelling and detachment of the paint film was obtained over at least 30% of the surface thereof, thus providing effective stripping.

The results obtained using the combinations of paints and supports listed above under A to D in given in the table below:

| Ether (E) | 100% E | 90% E + 10% DMSO | 90% E + 10% NMP | 50% E + 50% DMSO |
|---|---|---|---|---|
| anisole | 0 | ** | ** | ** |
|  |  |  |  | (a) (b) |
| 1,2-dimethoxybenzene | 0 | ** | ** | — |
| 1,3-dimethoxybenzene | 0 | ** | ** | — |
| 1,4-dimethoxybenzene | 0 | ** | ** | — |
| 1,2,3-trimethoxybenzene | 0 | ** | ** | — |
| 2-methoxy-1,3-dioxolane | 0 | ** | ** | — |
| 2-methoxy-3,4-dihydropyrane | 0 | ** | ** | — |
| 2,5-dimethoxytetrahydrofurane | 0 | ** | ** | — |
| ethyleneglycol dimethylether | 0 | ** | ** | — |
| diethyleneglycol dimethylether | 0 | ** | ** | — |
| 1-tert.butoxy-2-methoxyethane | 0 | ** | ** | — |
| methyl tertiobutyether | 0 | * to ** | — | — |

(a) tests carried out on glycero-phtalic and alkyd-urethane paints
(b) a slight improvement was noted with respect to the 90% E/10% DMSO mixture.
(—) test not implemented The ethers employed in the invention are less flammable than those employed to date for this purpose.

Use of the compositions according to the invention enables the best performance, as regards effectiveness of stripping and absence of flammability, to be achieved at least cost.

What is claimed is:

1. A process for removing a paint surface layer from a substrate coated therewith, comprising contacting the surface layer with an effective stripping amount of a paint stripping composition comprising, by volume:
   (a) 1 to 99% of an aprotic polar solvent selected from the group consisting of: dimethyl sulfoxide (DMSO), dimethyl formamide (DMF), N-methylpyrrolidone (NMP), N-methylmorpholine (NMm), γ-butyrolactone (BLo), acetonitrile (AcN) and mixtures thereof; and
   (b) 99 to 1% of an ether selected from the group consisting of anisole, 1,2-dimethoxybenzene, 1,3-dimethoxybenzene, 1,4-dimethoxybenzene, 1,2,3-trimethoxybenzene, 2-methoxy-1,3-dioxolane, 2-methoxy-3,4-dihydropyrane, 2,5-dimethoxytetrahydrofurane, ethylene glycol dimethyl ether, diethylene glycol dimethyl ether, and 1-tert-butoxy-2-methoxyethane.

2. The process according to claim 1, wherein the aprotic polar solvent is dimethyl sulfoxide.

3. The method according to claim 1, wherein the aprotic polar solvent and the ether are present in respective amounts of from 1 to 20% and from 99 to 80% by volume.

4. The method according to claim 3, wherein the aprotic polar solvent and the ether are present in respective amounts of from 5 to 15% and from 95 to 85% by volume.

5. The method according to claim 1, wherein said aprotic polar solvent and said ether are present in a volume ratio of about 10/90.

6. The method according to claim 1, wherein the aprotic polar solvent and the ether are present in respective amounts of from 20 to 80% and from 80% to 20% by volume.

7. The method according to claim 6, wherein the aprotic polar solvent and the ether are present in respective amounts of from 40 to 60% and from 60 to 40% by volume.

8. The method according to claim 7, wherein the volume ratio of the components is about 50/50.

9. The method according to claim 1, wherein the composition includes at least one additive that is a co-solvent, an activator, a fire proofing agent, a thickener, a stabilizer, a surfactant, an evaporation inhibitor, or an additive that is not a chlorine-containing solvent.

10. The method according to claim 1, wherein the composition includes a fluorinated surfactant comprising the compound of formula:

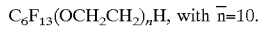

$C_6F_{13}(OCH_2CH_2)_nH$, with $\bar{n}=10$.

11. The method according to claim 1, wherein the paint surface layer is an acrylic-polyurethane or polyester-polyurethane paint, and the substrate is metallic.

12. The method according to claim 1, wherein the paint surface layer is a glycerophtalic or an alkyd urethane paint, and the substrate is wooden.

13. The method according to claim 1, wherein the components of the composition are mixed using a stirrer.

14. The process according to claim 1, wherein the paint is a paint employed in the building field and the substrate is metallic or wooden.

15. The process according to claim 14, wherein the substrate is aluminum.

16. The process according to claim 1, wherein the contact between the paint surface layer and the composition is maintained until the paint swells, forms bubbles and becomes detached.

17. The process according to claim 1, wherein the contact between the paint surface layer and the composition is achieved by immersion, spraying, soaking or by brush application.

18. The process according to claim 1, wherein the contact is carried out at a temperature of from 5 to 40° C., and for a time of from 15 to 45 minutes.

19. The process according to claim 18, wherein the temperature is ambient temperature.

20. A process for removing a paint surface layer from a substrate coated therewith, comprising contacting the surface layer with an effective stripping amount of a paint stripping composition comprising:

(a) an aprotic polar solvent selected from the group consisting of: dimethyl sulfoxide (DMSO), dimethyl formamide (DMF), N-methylpyrrolidone (NMP), N-methyl-morpholine (NMm), γ-butyrolactone (BLo), acetonitrile (AcN) and mixtures thereof;

(b) an ether selected from the family of ethers having:
 a flash point higher than 0° C.;
 a molar volume less than 160; and
 a molecule having one or several methoxy groups,
 wherein said aprotic polar solvent and said ether are present in respective amounts of from 40 to 60% and from 60 to 40% by volume.

21. The process according to claim 20, wherein the aprotic polar solvent is dimethyl sulfoxide.

22. The method according to claim 20, wherein the family of ethers is devoid of hydroxy groups.

23. The method according to claim 20, wherein the volume ratio of the components is about 50/50.

24. The method according to claim 20, wherein the ether is selected from the group consisting of: anisole, 1,2-dimethoxybenzene, 1,3-dimethoxybenzene, 1,4-dimethoxybenzene, 1,2,3-trimethoxybenzene, 2-methoxy-1,3-dioxolane, 2-methoxy-3,4-dihydropyrane, 2,5-dimethoxytetrahydrofurane, ethylene glycol dimethyl ether, diethylene glycol dimethyl ether, and 1-tert-butoxy-2-methoxy ethane.

25. The method according to claim 20, wherein the composition includes at least one additive that is a co-solvent, an activator, a fire proofing agent, a thickener, a stabilizer, a surfactant, an evaporation inhibitor, or an additive that is not a chlorine-containing solvent.

26. The method according to claim 20, wherein the composition includes a fluorinated surfactant comprising the compound of formula:

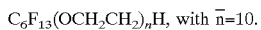

$C_6F_{13}(OCH_2CH_2)_nH$, with $\bar{n}=10$.

27. The method according to claim 20, wherein the paint surface layer is an acrylic-polyurethane or polyester-polyurethane paint, and the substrate is metallic.

28. The method according to claim 20, wherein the paint surface layer is a glycerophtalic or an alkyd urethane paint, and the substrate is wooden.

29. The method according to claim 20, wherein the components of the composition are mixed using a stirrer.

30. The process according to claim 20, wherein the paint is a paint employed in the building field and the substrate is metallic or wooden.

31. The process according to claim 30, wherein the substrate is aluminum.

32. The process according to claim 20, wherein the contact between the paint surface layer and the composition is maintained until the paint swells, forms bubbles and becomes detached.

33. The process according to claim 20, wherein the contact between the paint surface layer and the composition is achieved by immersion, spraying, soaking or by brush application.

34. The process according to claim 20, wherein the contact is carried out at a temperature of from 5 to 40° C., and for a time of from 15 to 45 minutes.

35. The process according to claim 34, wherein the temperature is ambient temperature.

* * * * *